(12) United States Patent
Crosby et al.

(10) Patent No.: US 11,745,435 B2
(45) Date of Patent: Sep. 5, 2023

(54) METHOD OF FORMING A SPLICED JOINT IN A HANDRAIL OR OTHER ELONGATE ARTICLE

(71) Applicant: EHC Canada, Inc., Oshawa (CA)

(72) Inventors: Kirby Wayne Crosby, Norwood (CA); Jason Wong, Ajax (CA); Reginald Anthony Butwell, Young's Point (CA); Andrew Oliver Kenny, Toronto (CA)

(73) Assignee: EHC CANADA, INC., Oshawa (CA)

( * ) Notice: Subject to any disclaimer, the term of this patent is extended or adjusted under 35 U.S.C. 154(b) by 598 days.

(21) Appl. No.: 16/766,386

(22) PCT Filed: Nov. 29, 2018

(86) PCT No.: PCT/CA2018/051522
§ 371 (c)(1),
(2) Date: May 22, 2020

(87) PCT Pub. No.: WO2019/104434
PCT Pub. Date: Jun. 6, 2019

(65) Prior Publication Data
US 2021/0370616 A1 Dec. 2, 2021

Related U.S. Application Data

(60) Provisional application No. 62/591,954, filed on Nov. 29, 2017.

(51) Int. Cl.
*B29C 65/00* (2006.01)
*B29C 65/10* (2006.01)
(Continued)

(52) U.S. Cl.
CPC ...... *B29C 66/02241* (2013.01); *B29C 65/103* (2013.01); *B29C 65/2076* (2013.01);
(Continued)

(58) Field of Classification Search
CPC ......... B29L 2031/709; B29L 2031/003; B66B 23/24; F16G 3/10; B29C 66/855;
(Continued)

(56) References Cited

U.S. PATENT DOCUMENTS 6,086,806 A * 7/2000 Weatherall ........ B29C 66/12841
156/304.5
6,241,153 B1 6/2001 Tiffany, III
(Continued)

FOREIGN PATENT DOCUMENTS

CA 2526529 A1 12/2004
CA 2482620 C 3/2005
(Continued)

OTHER PUBLICATIONS

Search Report and Written Opinion dated Feb. 8, 2019, in respect of PCT/CA2018/051522.
(Continued)

*Primary Examiner* — John L Goff, II
(74) *Attorney, Agent, or Firm* — Bereskin & Parr LLP/S.E.N.C.R.L., s.r.l.

(57) ABSTRACT

A handrail has a thermoplastic body having a generally C-shaped cross section, a stretch inhibitor in the thermoplastic body above a T-shaped slot and a slider fabric layer. The handrail includes first and second end portions, each comprising a forward part extending from an end surface of the end portion and a rear part adjacent the forward part. A method of forming a joint can include: providing cuts to separate a top section of the thermoplastic body from a base section including shoulder portions; for each end portion, removing at least shoulder portions from the forward part thereof, to leave a central portion including a forward part at the slider fabric layer and a layer of thermoplastic; cutting the forward parts to a required shape; and assembling the
(Continued)

first and second end portions together to form a spliced joint for moulding.

20 Claims, 14 Drawing Sheets

(51) Int. Cl.
| | |
|---|---|
| *B29C 65/20* | (2006.01) |
| *B29C 65/50* | (2006.01) |
| *B29C 65/70* | (2006.01) |
| *B29C 65/72* | (2006.01) |
| *B29L 31/00* | (2006.01) |
| *B66B 23/24* | (2006.01) |

(52) U.S. Cl.
CPC .......... *B29C 65/5042* (2013.01); *B29C 65/70* (2013.01); *B29C 65/72* (2013.01); *B29C 66/1142* (2013.01); *B29C 66/342* (2013.01); *B29C 66/5241* (2013.01); *B29C 66/729* (2013.01); *B29C 66/7212* (2013.01); *B29C 66/72141* (2013.01); *B29C 66/73921* (2013.01); *B29C 2793/0036* (2013.01); *B29C 2793/0081* (2013.01); *B29L 2031/003* (2013.01); *B29L 2031/709* (2013.01); *B66B 23/24* (2013.01)

(58) Field of Classification Search
CPC .......... B29C 66/4324; B29C 66/02241; B29C 66/1142; B29C 66/5241; B29C 66/7212; B29C 66/72141; B29C 66/729; B29C 66/73921; B29C 65/103; B29C 65/2076; B29C 65/70; B29C 65/72; B29C 2793/0036; B29C 2793/0081
See application file for complete search history.

(56) References Cited

U.S. PATENT DOCUMENTS

| | | |
|---|---|---|
| 6,761,259 B1 | 7/2004 | Onodera et al. |
| 6,790,401 B2 | 9/2004 | Yasuo |
| 7,670,539 B2 | 3/2010 | Kang |
| 8,038,818 B2 | 10/2011 | Murata et al. |
| 9,290,360 B2 | 3/2016 | Takeyama et al. |
| 9,579,839 B2 | 2/2017 | Kenny et al. |
| 10,124,992 B2 | 11/2018 | Takeyama et al. |
| 2008/0054527 A1 | 3/2008 | Kang |
| 2017/0166420 A1 | 6/2017 | Takeyama et al. |

FOREIGN PATENT DOCUMENTS

| | | |
|---|---|---|
| CN | 1218433 A | 6/1999 |
| CN | 101855059 A | 10/2010 |
| CN | 203957349 U | 11/2014 |
| CN | 203959626 U | 11/2014 |
| CN | 105415561 A | 3/2016 |
| FR | 2920508 A1 | 3/2009 |
| JP | 2000351570 A * | 12/2000 |
| JP | 2000351570 A | 12/2000 |
| JP | 2001328790 A | 11/2001 |
| JP | 2008265892 A | 11/2008 |
| KR | 20160111851 A | 9/2016 |
| UA | 74441 C2 | 12/2005 |
| WO | 2015182739 A1 | 12/2015 |
| WO | 2019/104434 A1 | 6/2019 |
| WO | 2019/104435 A1 | 6/2019 |

OTHER PUBLICATIONS

Extended European Search Report dated Aug. 5, 2021 in respect of European Application No. 18882579.8.

* cited by examiner

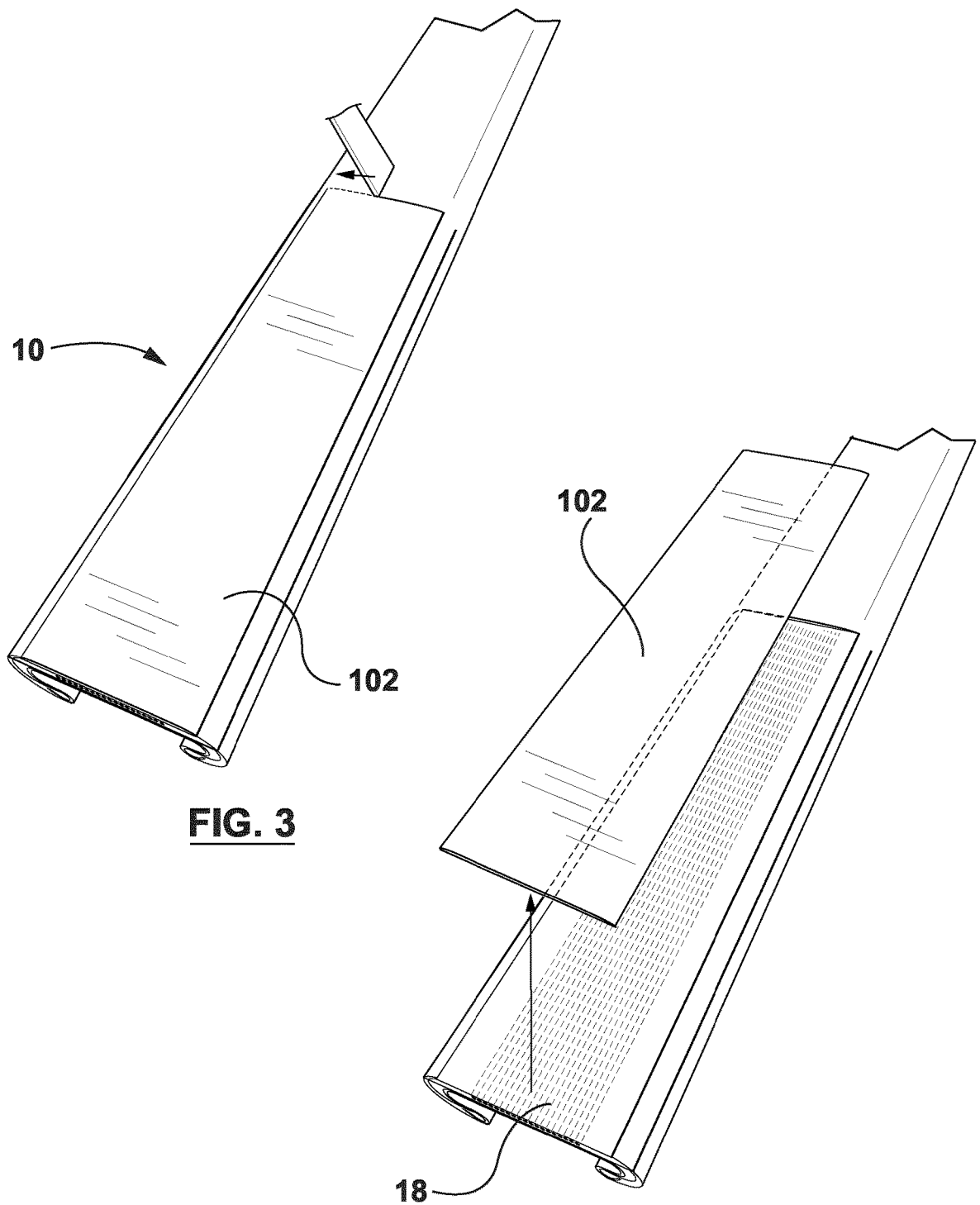

METHOD OF FORMING A SPLICED JOINT IN A HANDRAIL OR OTHER ELONGATE ARTICLE

CROSS-REFERENCE TO RELATED APPLICATIONS

This is a national stage application of International Application No. PCT/CA2018/051522 filed on Nov. 29, 2018, which claims priority to U.S. Provisional Application No. 62/591,954 filed on Nov. 29, 2017, and the entire contents of each are hereby incorporated herein by reference.

FIELD

The present disclosure relates generally to a method of forming a spliced joint in a handrail or other elongate article of constant cross-section.

BACKGROUND

The following paragraphs are not an admission that anything discussed in them is prior art or part of the knowledge of persons skilled in the art.

U.S. Pat. No. 6,086,806 discloses a mould and method of forming a joint in a handrail for escalators or moving walkways. The handrail may have a generally C-shaped cross section defining an internal generally T-shaped slot. The handrail is formed by extrusion and comprises a first layer of thermoplastic material extending around the T-shaped slot. A second layer of thermoplastic material extends around the outside of the first layer and defines the exterior profile of the handrail. A slider layer lines the T-shaped slot and is bonded to the first layer. A stretch inhibitor extends within the first layer. The first layer may be formed from a harder thermoplastic than the second layer. The entire contents of U.S. Pat. No. 6,086,806 are herein incorporated by reference.

INTRODUCTION

The following paragraphs are intended to introduce the reader to the more detailed description that follows and not to define or limit the claimed subject matter.

According to one aspect of the present disclosure, there is provided a method of forming a spliced joint in a moving handrail, the handrail including a thermoplastic body having a generally C-shaped cross section and defining a T-shaped slot, a stretch inhibitor in the thermoplastic body above the T-shaped slot and a slider fabric layer around an interior of the T-shaped slot, wherein the handrail includes first and second end portions, each including a forward part extending from an end surface of the end portion and a rear part adjacent the forward part, the method including: in each of the rear and forward parts of the first and second end portions, providing a first horizontal cut to separate a top section of the thermoplastic body from a base section including shoulder portions of the thermoplastic body, the slider fabric layer and a layer of thermoplastic above the slider fabric layer, and joining the shoulder portions together; for each end portion removing at least shoulder portions from the forward part thereof, to leave a central portion including a forward part at the slider fabric layer and a layer of thermoplastic; cutting the forward parts of the slider fabric layer and thermoplastic to a required shape; and assembling the first and second end portions together to form a spliced joint for moulding.

According to another aspect of the present disclosure, there is provided a method of forming a spliced joint in a moving handrail, the handrail including a thermoplastic body having a generally C-shaped cross section and defining a T-shaped slot, a stretch inhibitor in the thermoplastic body above the T-shaped slot and a slider fabric layer around an interior of the T-shaped slot, wherein the handrail includes first and second end portions, each including a forward part extending from an end surface of the end portion and a rear part adjacent the forward part, the method including: in each of the rear and forward parts of the first and second end portions, providing a first horizontal cut to separate a top section of the thermoplastic body from a base section including shoulder portions of the thermoplastic body, the slider fabric layer and a layer of thermoplastic above the slider fabric layer, and joining the shoulder portions together; for each of the base sections, removing a forward part thereof, to leave rear parts thereof; heating facing surfaces of the rear parts of the base sections to cause melting of the thermoplastic; and mounting the first and second end portions on a mandrel and sliding the first and second end portions together, so that the rear parts of the base sections abut one another, whereby melted thermoplastic of the base sections fuses together to form a joint.

Another aspect of the present disclosure provides a method of forming a spliced joint in a moving handrail, the handrail including a thermoplastic body having an axis, a generally C-shaped cross section and defining a T-shaped slot, a stretch inhibitor in the thermoplastic body above the T-shaped slot and a slider fabric layer around an interior of the T-shaped slot, wherein the handrail includes first and second end portions, each including a forward part extending from an end surface of the end portion and a rear part adjacent the forward part, the method including: in each of the rear and forward parts of the first and second end portions, providing a first horizontal cut to separate a top section of the thermoplastic body from a base section including shoulder portions of the thermoplastic body, the slider fabric layer and a layer of thermoplastic above the slider fabric layer, and joining the shoulder portions together; for each end portion, marking a centerline in a center plane perpendicular to the axis of the handrail, on top of the base section; removing at least the thermoplastic of the forward part of the base section; transferring a centerline marking around the handrail end portion to the slider fabric; providing inclined lines on the slider fabric on the inside of the shoulder portions, in a plane extending at a 45 degree angle to the center plane from an intersection with the center plane at the top of the T-shaped slot and away from the forward part; and removing slider fabric between the inclined plain and center plane.

Another aspect of the present disclosure provides a method of forming a spliced joint in a moving handrail, the handrail including a thermoplastic body having a generally C-shaped cross section and defining a T-shaped slot, a stretch inhibitor in the thermoplastic body above the T-shaped slot and a slider fabric layer around an interior of the T-shaped slot, wherein the handrail includes first and second end portions, each including a forward part extending from an end surface of the end portion and a rear part adjacent the forward part, the method including: in each of the rear and forward parts of the first and second end portions, providing a first horizontal cut to separate a top section of the thermoplastic body from a base section including shoulder portions of the thermoplastic body, the slider fabric layer and a layer of thermoplastic above the slider fabric layer, and joining the shoulder portions together; removing forward parts of the base sections to permit the rear parts of the base sections to abut one another; providing a second horizontal cut above the stretch inhibitor, extending through the forward and rear parts and vertical cuts at the end of the second horizontal cuts to remove a scalp layer from each of the first and second end portions; cutting stretch inhibitor in the interweave layers to form complementary end patterns; providing a plurality of thermoplastic ply layers between the interweave layers and the base section and above the interweave layers; providing a replacement cap above the interweave layers; and placing the assembled spliced joint in a mould and subjecting the spliced joint to a temperature and pressure to cause the thermoplastic of the first and second handrail end portions and of the plies to fuse together.

A further aspect of the present disclosure provides a method of forming a spliced joint in a moving handrail, the handrail including a thermoplastic body having a generally C-shaped cross section and defining a T-shaped slot, a stretch inhibitor in the thermoplastic body above the T-shaped slot and a slider fabric layer around an interior of the T-shaped slot, wherein the handrail includes first and second end portions, each including a forward part extending from an end surface of the end portion and a rear part adjacent the forward part, the method including: in each of the rear and forward parts of the first and second end portions, providing a first horizontal cut to separate a top section of the thermoplastic body from a base section including shoulder portions of the thermoplastic body, the slider fabric layer and a layer of thermoplastic above the slider fabric layer, and joining the shoulder portions together; for each end portion, removing at least shoulder portions from the forward part thereof, to leave a central portion including a forward part at the slider fabric layer and a layer of thermoplastic; cutting the forward parts of the slider fabric layer and thermoplastic to a required shape; providing for each shoulder portion a saddle having parallel inner and outer edges; for each shoulder portion, marking a line for the location of the outer edge of the saddle; for each saddle, aligning the outer edge with the marked line on the shoulder portion, heating the saddle adjacent the outer edge thereof and pressing the saddle against the shoulder portion to secure the saddle; and subsequently ensuring the saddle is mounted closely inside the T-shaped slot and securing the inner edge of the saddle to slider fabric.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way. In the drawings:

FIGS. 3 and 4 show removal of a scalp layer;

DESCRIPTION OF THE EMBODIMENTS

Figure 1:
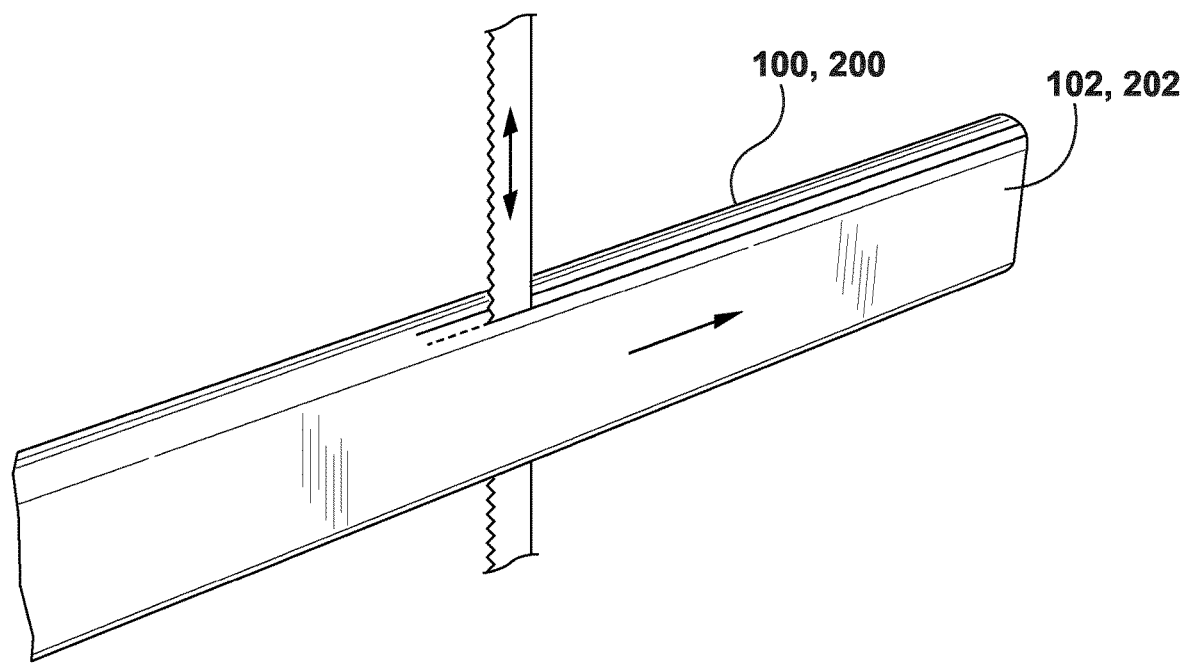
FIG. 1 is a view of an end portion of a handrail showing formation of cuts.

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

In the present disclosure, various elements or components may be designated as 'first' and 'second' or alternatively as 'upper' and 'lower'. In general it will be understood that the mould assembly and other components can be used in any orientation, and references to 'upper' and 'lower' are for convenience. The mould assembly may be described for moulding a handrail in an inverted position, but it will be understood that the joint in the handrail, generally can be formed with the handrail and the components of the mould in any orientation.

Additionally, while various components of the mould assembly and handrail end portions may be identified with descriptions that indicate an orientation, such as 'lower' and 'upper', this is only to facilitate understanding, and it is not necessary that they be used or present in that orientation. In particular, a handrail has a surface that is the top surface in normal use available to be grasped, but when moulding a spliced joint, the handrail is inverted, as detailed below. In any event, in a handrail installation, the handrail is inverted in the return run.

The methods described below includes a number of separate steps, some steps, necessarily, must be carried out in a certain sequence. Other steps are not so constrained, and can be carried out in any order. The sequence described below may provide certain advantages in some circumstances, but is not limiting.

Steps of the methods will require the use of a heat paddle and a hot air gun. As they may require time to heat up, the first step can be to turn on both the heat paddle and the hot air gun, to preheat them. The hot air gun can be set to a temperature of, for example, 350° C., depending upon the materials used for the handrail.

As shown, initial steps require preparation of the handrail ends, here designated as a first handrail end 100 and a second handrail end 200. Corresponding parts of the first and second handrail end portions 100, 200 are given similar and corresponding reference numerals, as 1XX and 2XX.

The handrail, as a whole, is designated by the reference numeral 10. The handrail 10 is formed from thermoplastic body and has a generally C-shaped cross section, with an internal T-shaped slot 12. The thermoplastic body of the handrail 10 may include a first layer of thermoplastic 14 and a second layer of thermoplastic 16. Elongate stretch inhibitors 18 extend in a plane in the first layer of thermoplastic 14. The stretch inhibitors 18 can vary in number, and may include a single stretch inhibitor element, e.g. a steel tape, and can be formed from a variety of materials. The stretch inhibitors 18 may be formed as steel wires, and for simplicity and brevity, may be identified as "wires" in the following description of method, but it is to be understood that any suitable stretch inhibitor can be used.

A slider fabric layer 20 is provided, lining the T-shaped slot 12 in a known manner, to provide reduced friction between the handrail 10 and a guide on which the handrail is mounted.

As an initial step, each of the handrail ends 100, 200 requires horizontal cuts, to separate a scalp layer 102, 202 from an interweave layer 104, 204 including the stretch inhibitor 18, and to separate those interweave layers 104, 204, from the remaining body of the handrail, in base sections indicated at 106, 206.

The scalp and interweave layers 102, 202, 104, 204 include top sections 112, 212 of the handrail portions. For a production splice, produced in a factory setting, the cuts may be made using a band saw. As shown in FIG. 1, to cut with a band saw, the handrail is turned through 90° (degrees), and the band saw then makes a cut in the vertical plane. Where a handrail splice is to be made in the field, i.e. at a site of the installation of a handrail, these cuts may be made using a knife.

With these cuts made, the first and second handrail end portions 100, 200 can be slid onto a splicing mandrel 40. The splicing mandrel 40 has dimensions corresponding to the internal dimensions of the T-shaped slot 12, to provide a close fit for the handrail end portions 100, 200. The splicing mandrel 40 is also provided with a number of horizontal, precut grooves 42, to facilitate cutting and other operations in the splice process.

As shown in FIGS. 1 to 4, a first step in the method is to remove the scalp layers 102, 202. To remove the scalp layers 102, 202, a metal square can be used as a straight edge and a utility knife can be used to cut through the thermoplastic, taking care not to cut or score the stretch inhibitor 18.

Both handrail end portions 100, 200 are marked at 90° across the end of the interweave layers 104, 204 at 10 mm from the end of the interweave layers 104, 204. Wire cutters are then used to cut across this line, and to discard the 10 mm pieces of the interweave layers 104, 204, as shown at 135 in FIG. 5.

Figure 14:
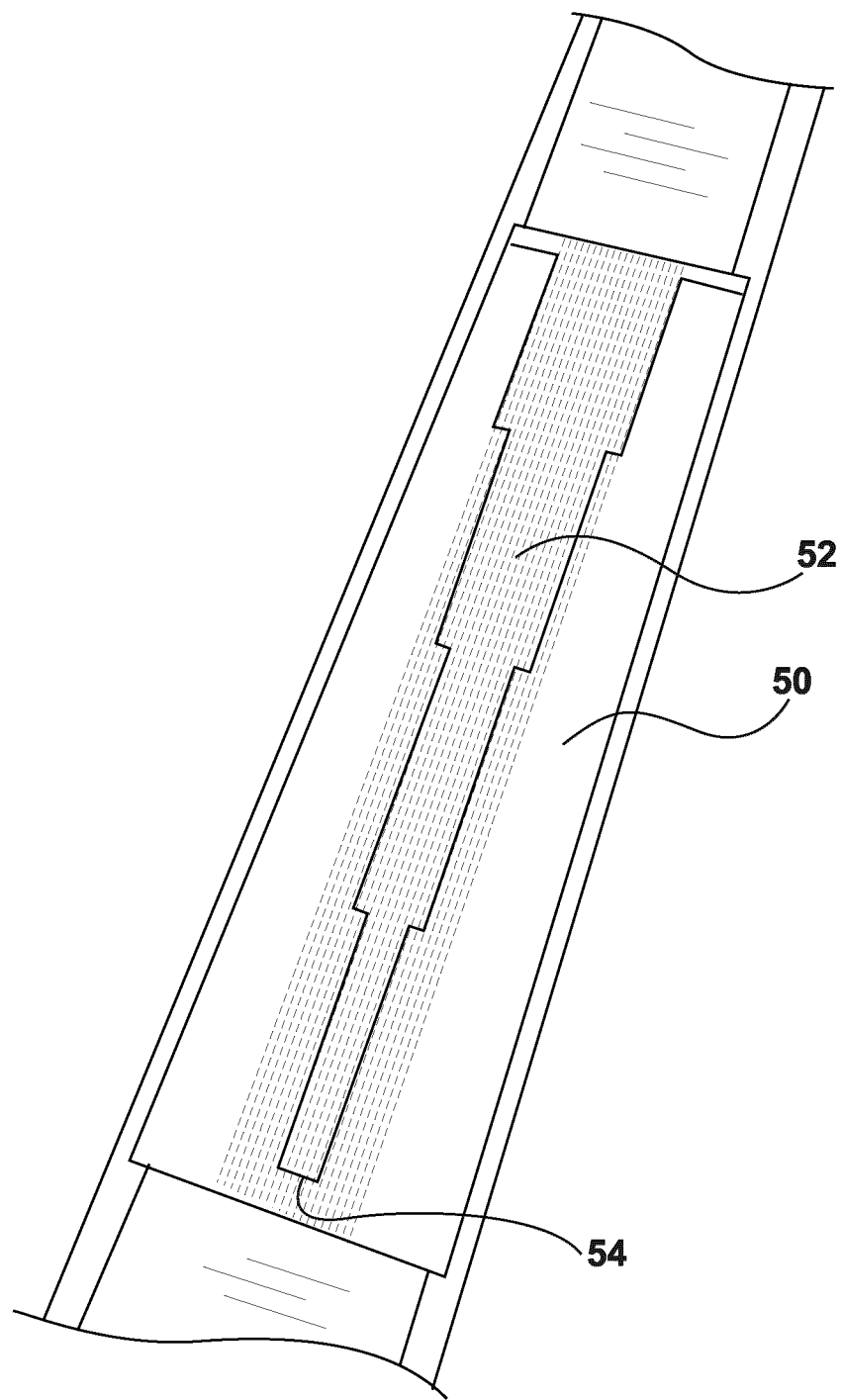
FIG. 14 shows a perspective view of end portions assembled together, and an interweave pattern.

The interweave layers 104, 204 will need to be cut, to form a desired interweave pattern. FIG. 14, described below, shows an exemplary interweave pattern for handrails with twenty wires 18 and fourteen wires 18. As shown in FIG. 14, an interweave pattern for twenty wires has a female end pattern 50 and a male end pattern 52. As shown, the wires or stretch inhibitors 18 are cut to lengths of 0, 63, 125, 188 and 250 mm, from an end of the interweave pattern indicated at 54. For a handrail with fourteen wires or stretch inhibitors 18, there may be four different lengths, measured as 0, 65, 137 and 250 mm, from the end of the interweave pattern.

As shown in FIG. 14, each interweave pattern is formed by vertical cuts made with a knife along the length of the interweave layers 104, 204. With these longitudinal cuts made, wire cutters are used to cut off the portions of the wires 18 and the corresponding surrounding thermoplastic, to leave the patterns shown in FIG. 14. As detailed below, the slider fabric layer 20, in one of the handrail ends 100, 200 is formed with a tab 130. It may also have the female interweave pattern 50.

With the handrail ends 100, 200 mounted on the mandrel 40, the interweave layers 104, 204 are folded back, and may be held with hand clamps, to leave the remaining base sections 106, 206 exposed.

Figure 5:
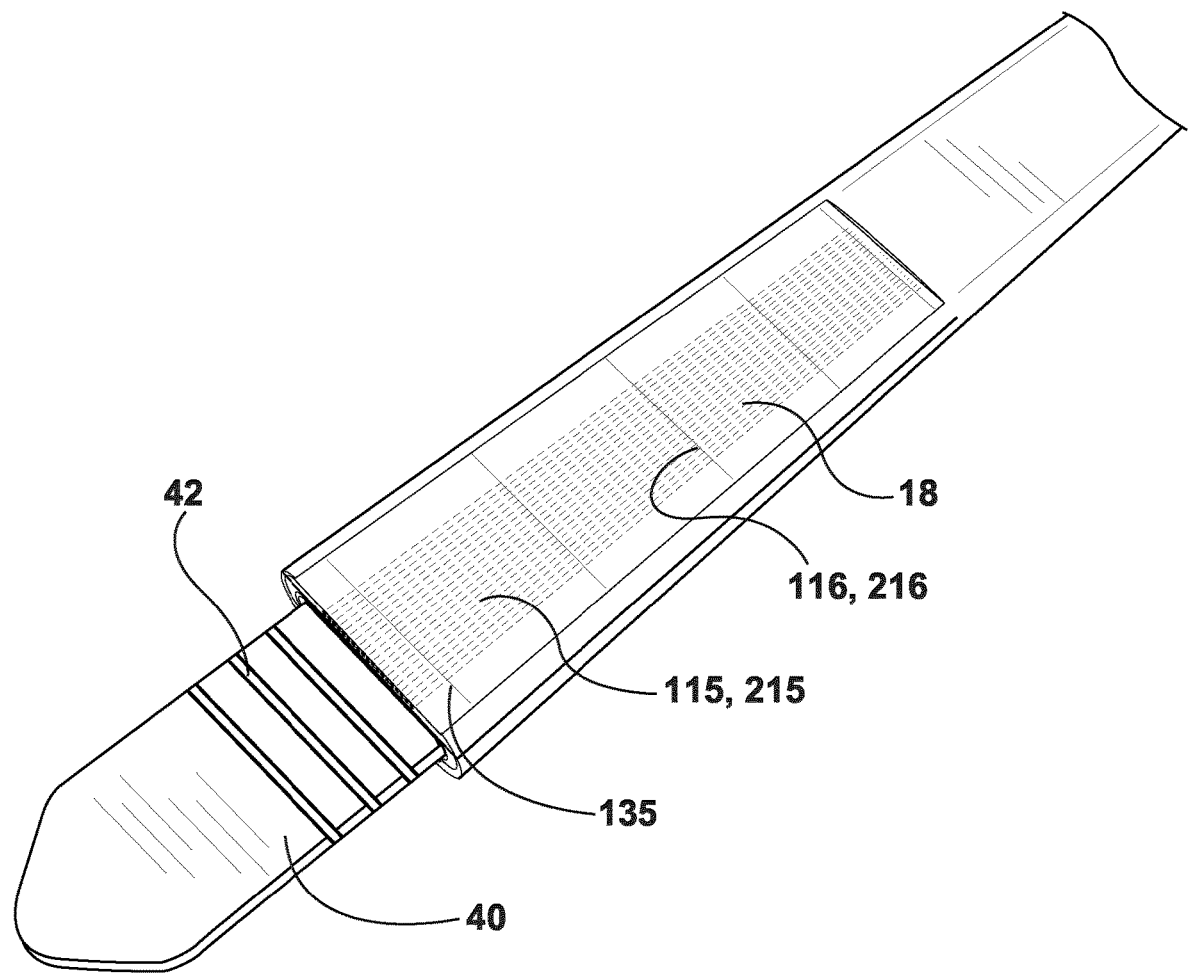
FIG. 5 is a perspective view showing the end portion of the handrail mounted on a mandrel.

As shown in FIG. 5, on a top surface 115, 215 of the base section 106, 206, a 90 degree centerline 116 is drawn, generally across the top of the slider fabric layer 20 and a covering layer of polyurethane. For the interweave pattern for twenty wires the line 116 will be drawn at 125 mm from the end of the respective first and second handrail end.

The cut forming the remaining body portions or base sections 106, 206, results in each of the body portions 106, 206 having shoulder portions 113, 213 connected by a thin central portion 114, 214. The central portions 114, 214 include a thin layer of thermoplastic above a forward part of the slider layer 20.

Figure 6:
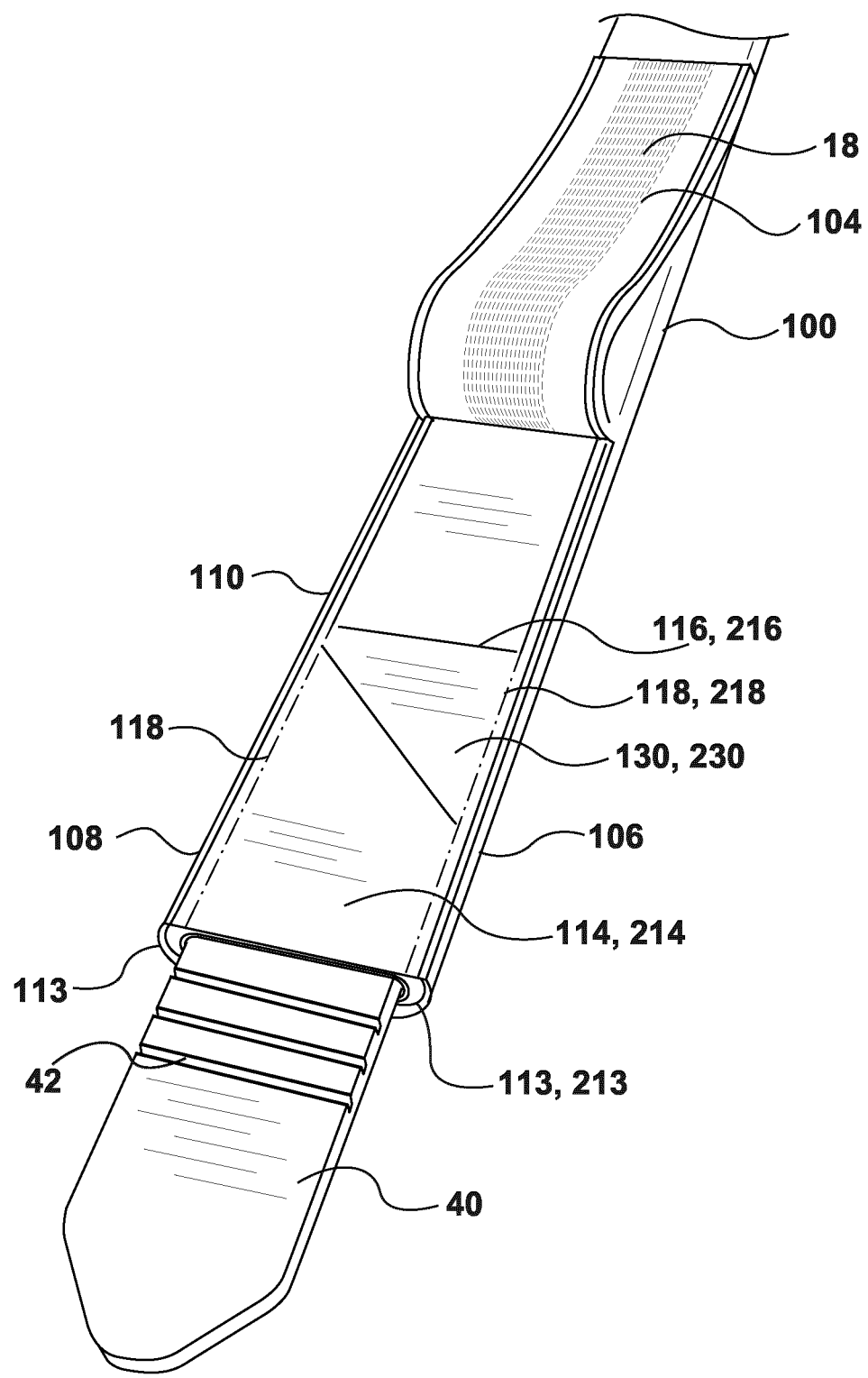
FIG. 6 is a perspective view showing the end portion of the handrail mounted on a mandrel and a top layer bent back.

As shown in FIG. 6, from the centerline 116, 216, score lines 118, 218 are made along the length of the handrail, approximately where the slider fabric 20 turns down around the splicing mandrel 40. In cutting these lines 118, 218, care is to be taken to not cut through the slider fabric 20, and these lines 118, 218 serve to separate the thermoplastic of the shoulder portions 113, 213 from the central portions 114, 214, with the slider layer 20 being intact.

Figure 7:
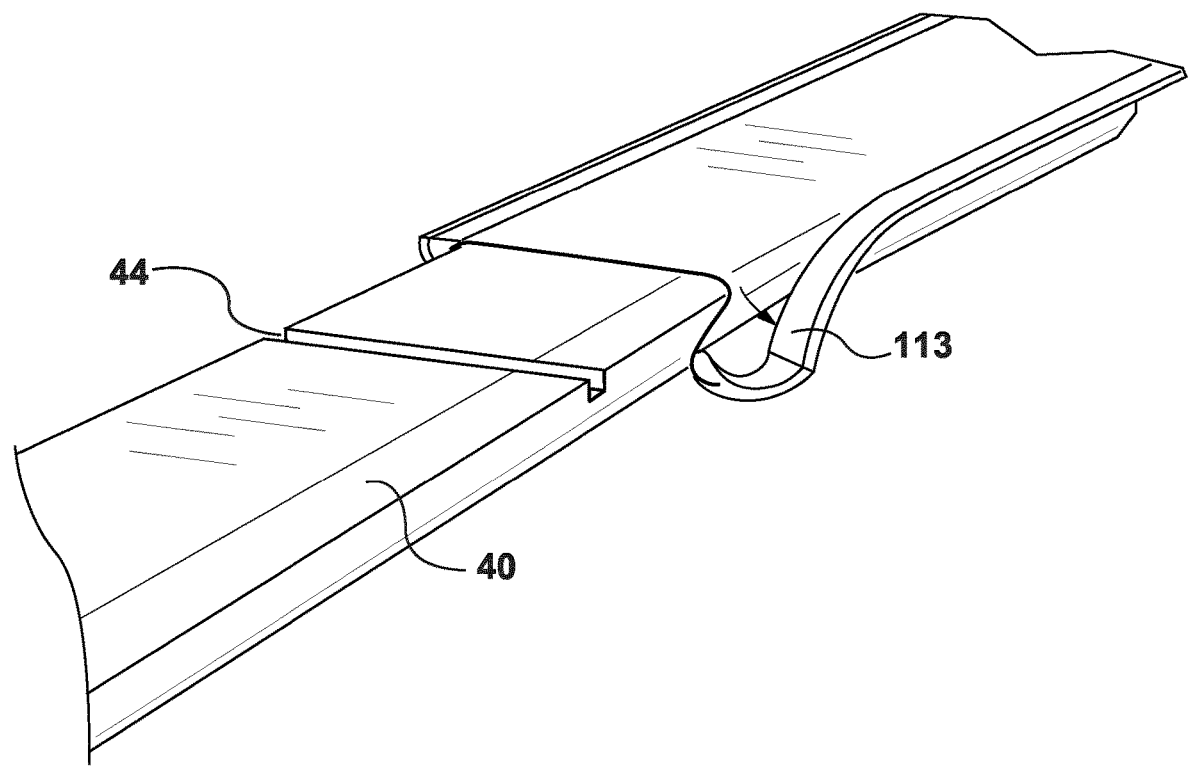
FIG. 7 is a perspective view showing the end portion of the handrail mounted on a mandrel and separation of a shoulder portion.

Then, using either a pair of small device vise grips, or a pair of ply grippers, each of the shoulder portions 113, 213 is grasped and pulled away from the underlining slider fabric 20 at the shoulder below the cuts or score lines 118, 218, as shown in FIG. 7.

Figure 2:
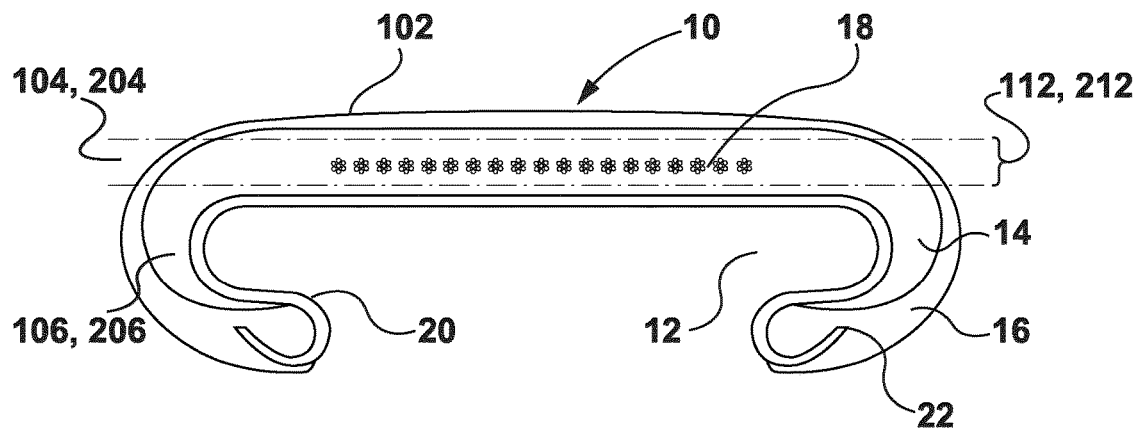
FIG. 2 is an end view of a handrail showing location of cuts.

As shown in FIG. 2, edges 22 of the slider fabric 20 are embedded in the polyurethane of the second thermoplastic layer 16, and the previous step is not intended to remove edges of the slider fabric layer 20 from the polyurethane.

Figure 8:
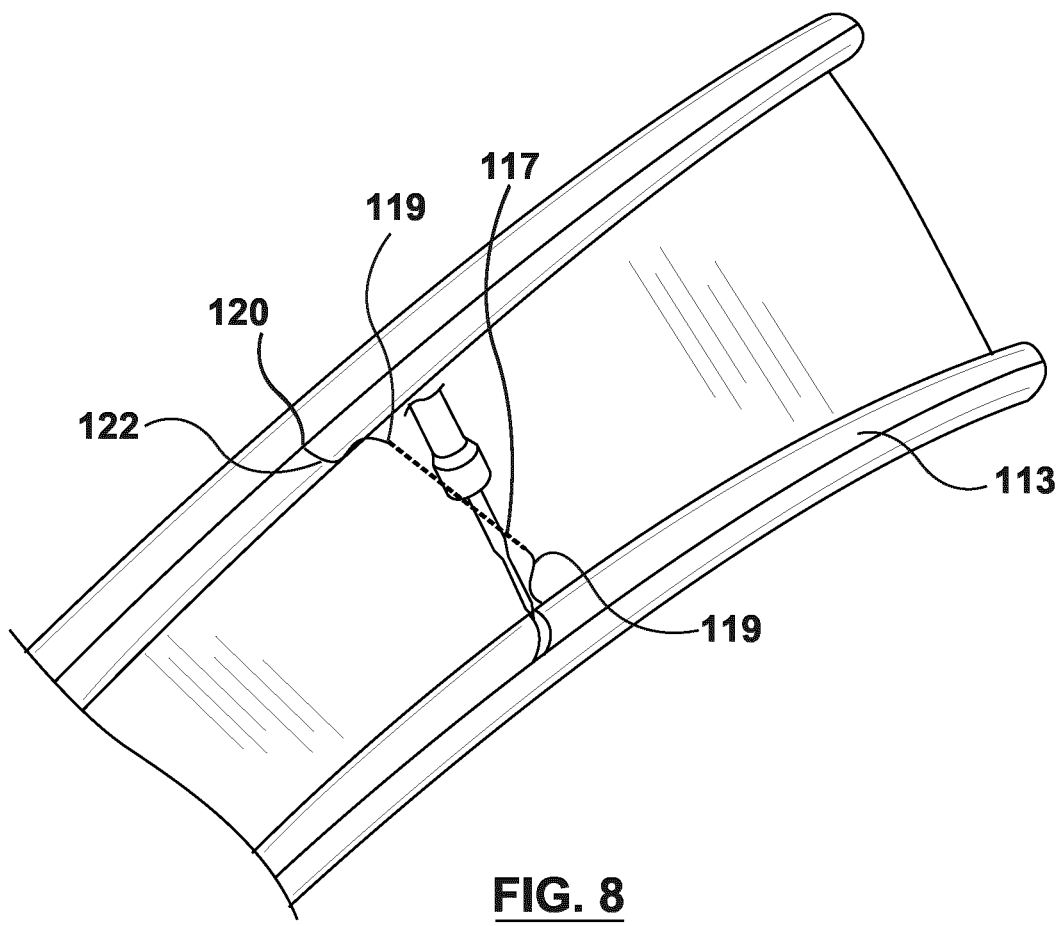
FIGS. 8 and 9 are perspective views showing cutting of a slider fabric layer.

Once the polyurethane of the shoulder portions 113, 213 has been detached as detailed above, from approximately 30 mm from the cut end of the respective handrail end portion 100, 200, the handrail end portion 100, 200 is removed from the mandrel 40, turned over, and clamped onto the mandrel 40 in an inverted position, as shown in FIG. 8.

The centerline 116, 216 is then manually transferred around shoulders of the handrail to the top of the shoulder portions 113, 213, and into the belly of the handrail, so as to be marked on the interior of the slider fabric 20 as indicated at 117.

As shown in FIG. 8 for the handrail end portion 100 and a similar procedure is applied to the other handrail end portion 200, a mark 119 is provided on the shoulder portion 113, 5 mm inside the lip, on the centerline 117. From this mark 119, a required distance, for example 20 or 25 mm, is measured back from the centerline 116, and a mark 120 is made at the top of the lip. The marks 119 and 120 are then joined with a straight line 122 straight in the sense that it lies in a plane at a 45° angle to a plane perpendicular to the axis of the handrail at the centerline 117, but appears curved in the drawings, and this is done for both sides of the shoulder portions 113.

Using, for example, a Dremel™, a rotary abrasive tool, or other tool to grind or otherwise remove a line portion of the slider fabric layer 20, a line is traced along the straight lines 122.

Figure 9:
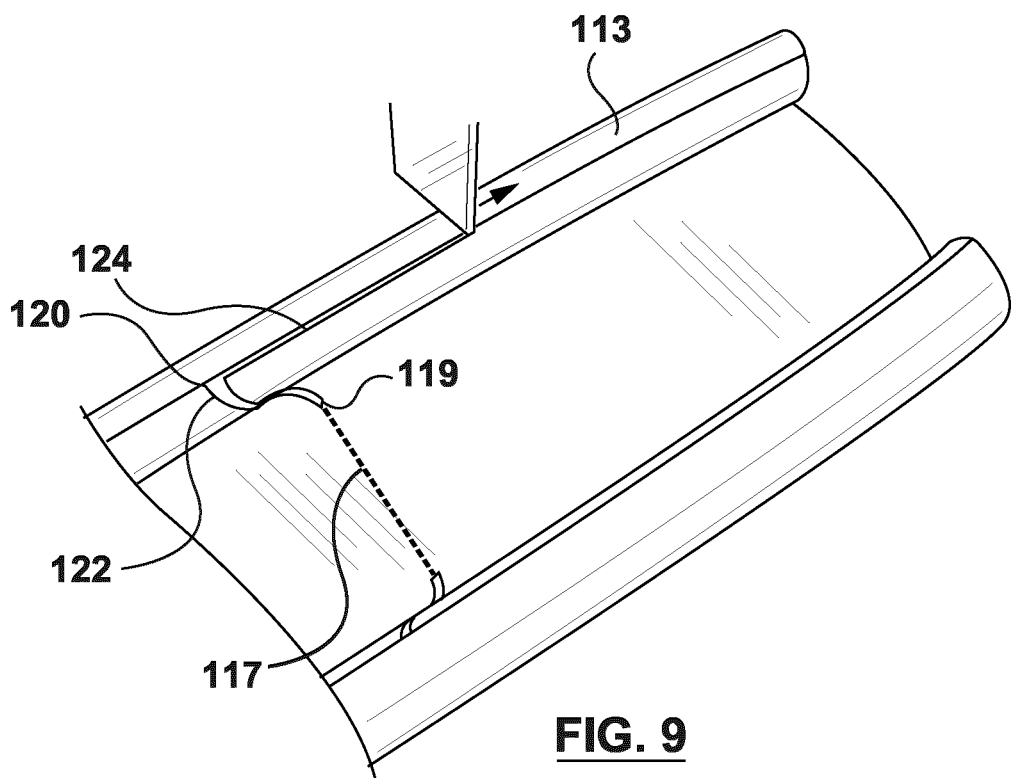
Figure 10:
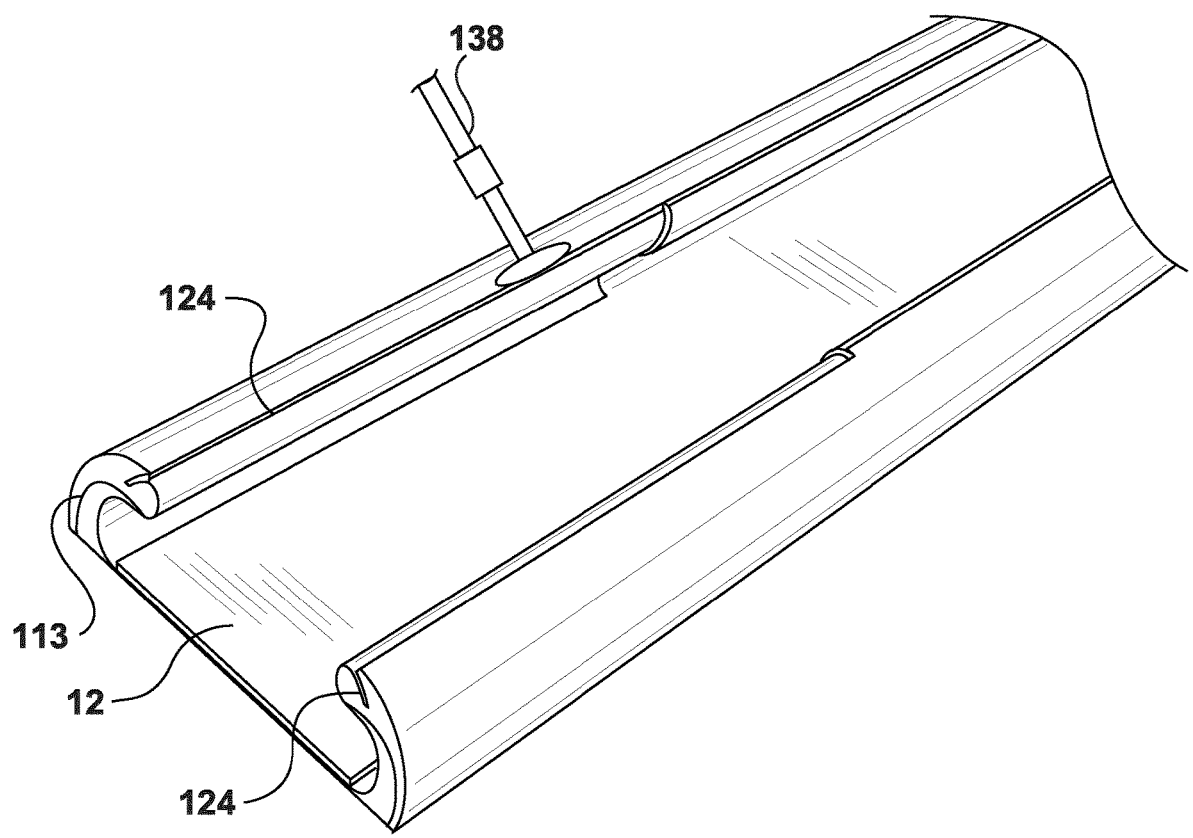
FIG. 10 is a perspective view showing removal of edges of the slider fabric layer with a power tool.

With a utility knife, lengthwise cuts are made along the edge of the shoulder portions 113 as shown in FIGS. 9 and 10, and indicated at 124. These cuts are from the centerline 116, minus the 25 mm, to the cut end of the handrail, for both sides of the handrail portion end 100. The knife can be inclined vertically and it should be ensured that it catches the edge of the slider fabric layer 20 buried in the polyurethane or thermoplastic.

Starting from the cut end of the handrail, a pair of small vise grips is used to remove the fabric from the throat area, i.e. the inside of the T-shaped slot, and around the lip area. This may require leveraging motion and the fabric layer 20 is removed back up to the centerline 116, including the area that is previously cut back 25 mm from the centerline.

Using a Dremel™ or other suitable tool (e.g. a Dremel™ bit No. 199), the remaining fabric of the slider fabric layer 20 is removed along the shoulder portions 113. The tool 138 should be positioned as shown in FIG. 10, to remove only the fabric along the line, without cutting too deeply into the thermoplastic carcass. All fabric should be removed from this area to prevent possible failure of the splice in use.

Figure 11:
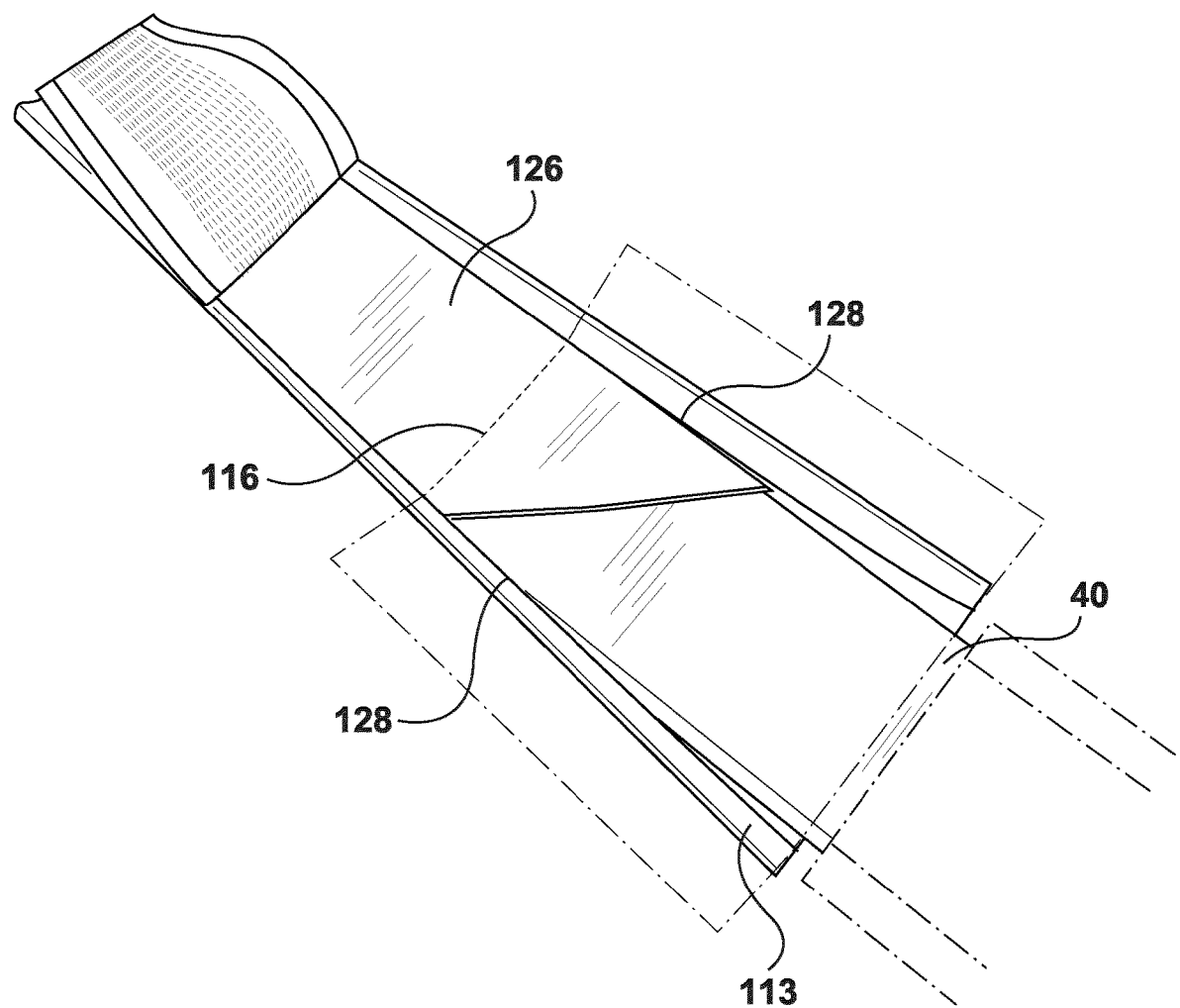
FIG. 11 is a perspective view showing cutting of a slider fabric layer to form a tab.

The first handrail end portion 100 is then returned to the normal upright position and slipped back onto the splicing mandrel 40. A fabric end portion 126, between the centerline 116 and the end surface of the first handrail end portion 100 is then entirely free of the shoulder portions 113. As shown in FIG. 11, two parallel lines 128 are drawn from the corner which was cut with the Dremel™ tool towards the end of the splice, using a utility knife. Measuring 15 mm from the centerline 116, a cut is made at 45° towards the end of the splice. A metal carpenter's square, or the like, is used to cut across this line to form an angled tab 130.

For other handrails, a measurement is made 25 mm from the centerline 116 towards the end of the first handrail 100 with the fabric layer at 90 degrees. A cut is made across this line to form a rectangular tab at 25 mm.

For the second, or other handrail, end 200, the fabric 20 is cut across at the centerline 216, using a metal carpenter's square at 90 degrees.

The tab 130 size should be a minimum of 15 mm×25 mm. The remaining fabric can be discarded.

The shoulder portions 113 are removed at the centerline 116 with a utility knife. Isopropyl or ethyl alcohol can be used on the blade during cutting to provide lubrication. A clamp may be used to hold the shoulders portions 113 against the mandrel 40, to help keep the cuts straight. A sawing action may be used to avoid deforming the handrail, thereby creating an uneven cut. To ensure a good weld, as detailed below, a square cut should be achieved.

Once the shoulder portions 113 have been cut, it should be ensured that the cut to the bottom of the lip is as perpendicular to the access of the handrail as possible, so that a good weld can be achieved later.

For any cuts through the shoulder portions 113 that are poorly made, the cut surface should be moved to a center slot 44 of the mandrel 40, the shoulders should then be cut square using a utility knife in a sawing motion, while following the edge of the center slot 44. While performing the cut, the shoulder portions 113 should be held firm against the mandrel 40, so that a utility knife follows the flat surface of the center slot 44. Again, isopropyl alcohol can be used as a lubricant.

To assemble a splice, both of the handrail end portions 100, 200 are slid onto the splice mandrel 40, so that the ends of the slider fabric layers line up with edges of the center slot 44. The tab 130 is tucked under the first handrail end portions 100, to ensure that it will not interfere or get damaged in the next step.

Figure 12A:
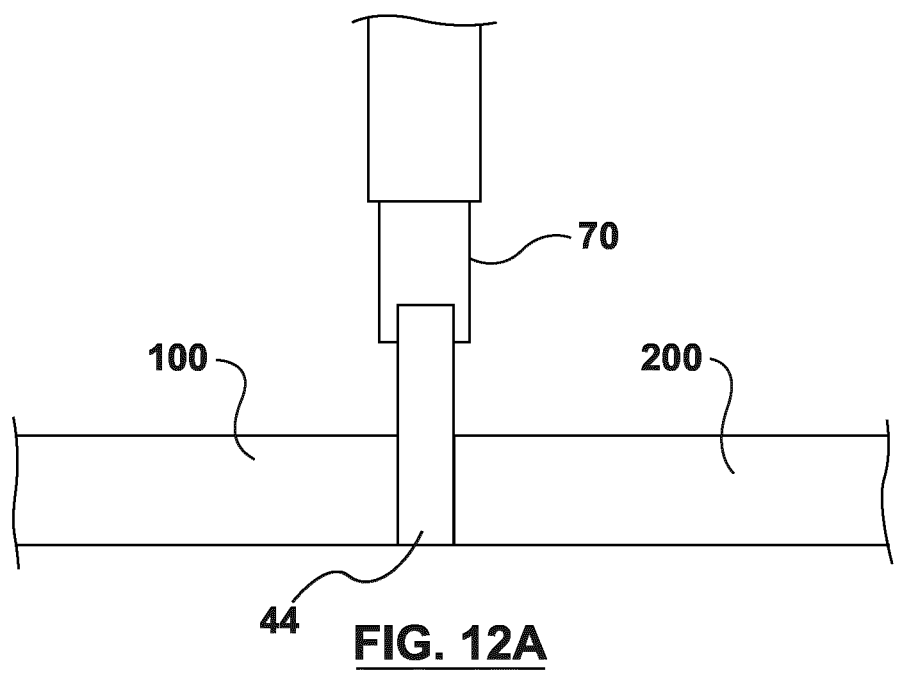
FIGS. 12A and 12B are side views showing use of a heat paddle.

A gap is provided between the handrail end portions 100, 200 to allow enough space for a heat paddle 70 to be placed between the two handrail ends, as shown in FIG. 12A.

Figure 12B:
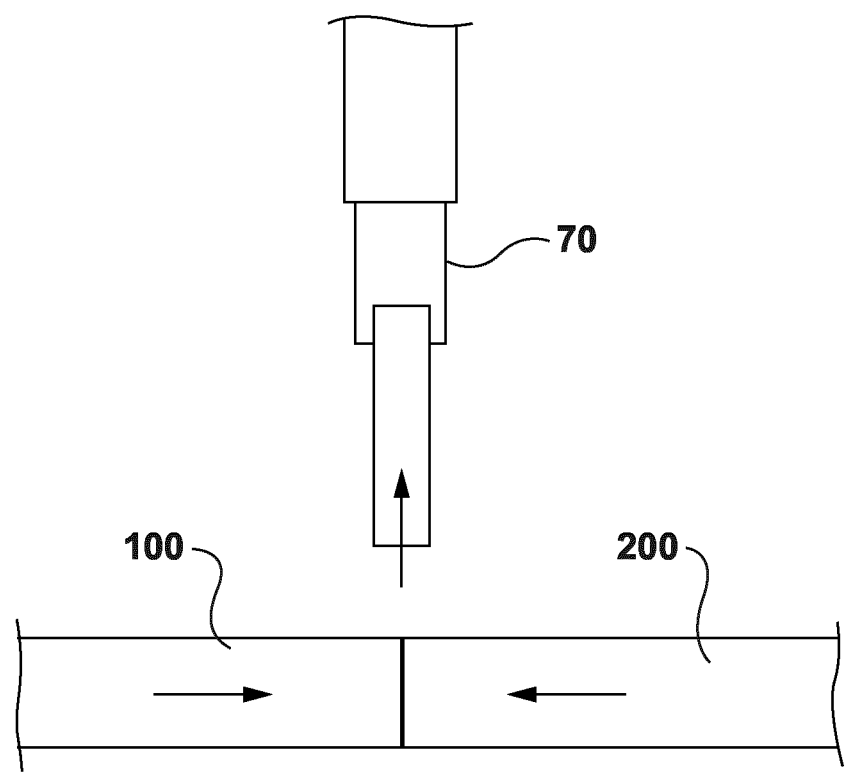

The heat paddle 70 is heated to a desired temperature, and if required, it can be cleaned using a wire brush. The heat paddle 70 is placed between the end portions 100, 200, making sure that the 25 mm overlap does not get damaged, and inserted into the slot 44. The end portions 100, 200 are pushed against the heat paddle 70. Once the end surfaces of the first and second handrail end portions 100, 200 start melting and flaring out, to the extent to providing 1 mm mushroom effect, the heat paddle 70 is removed, as shown in FIG. 12B, and the handrail ends 100, 200 are quickly pushed tightly together for 5 to 10 seconds, to bond the ends together.

The following elements may be considered, to ensure a good bond: (a) the melt is even all the way around; (b) the ends are pushed together very quickly; (c) the shoulders are properly aligned with each other during the welding, while pushing the two ends together; and (d) once the two handrail end portions 100, 200 are welded together, the resulted joint is inspected by flexing the joint by hand and visually checking for cracks; if the joint cracks, the splice must be separated, re-welded and tested again.

Figure 13:
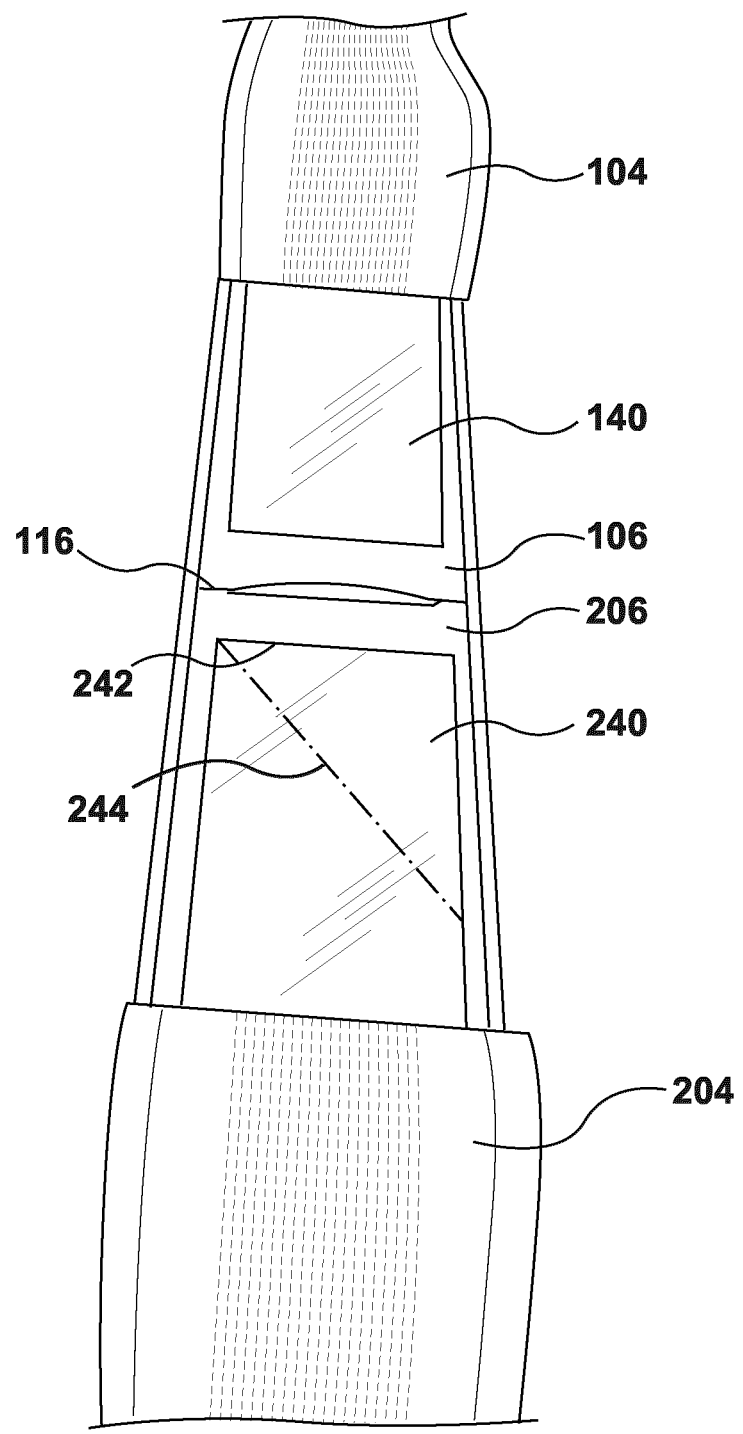
FIG. 13 shows a perspective view of end portions assembled together, prior to forming an interweave pattern.

Referring to FIG. 13, with the interweave layers 104, 204 held back, body ply layers 140, 240 can be inserted to compensate for the thermoplastic lost due to a cutting step.

On the second top surface 212, above where the tab 230 will be, a line is marked 25 mm from the centerline 216. A body ply 240 is provided and inserted under the interweave layer 204. It is cut across at the line 242. When an angled tab is provided, it is then further cut at an angle of 45° at 244, so that this body ply 240 has a shape corresponding to the underlining tab and not extending over the tab 130.

Correspondingly, for the first handrail end 100, a body ply 140 is provided, which again is fitted straight under the interweave layer 104. It is cut so that it extents up to the centerline 116.

The body ply layers 140, 240 are welded to the underlying body portions 106, 206 of the handrail, by a heat gun. The heat gun may be set to a temperature of 350° C. The heat gun may be aimed between the respective ply and the underlining thermoplastic, to warm the thermoplastic before rolling it down, for example with a roller, e.g. a 2 inch roller. When rolling, care may be taken to ensure all air is expelled, as trapped air can result in voids in the spliced joint. It may only be necessary to tack the body ply layers 140, 240 in place without a complete weld being performed at this time.

A utility knife can be used to trim the mushroom effect from the shoulder portions 113, 213.

The interweave layers 104, 204 can then be released by removing the hand clamps. If not already done so, the interweave patterns of FIG. 14 can then be formed or made.

The interweave pattern may be formed at this time, by first forming the male end pattern 52. Using the male end pattern 52 as a template, the female end pattern 50 can then be cut. The end portions of the interweave butt together with a 1 mm gap, with no overlap.

As required, third and fourth plies of thermoplastic can be provided above the interweave, the plies can vary by style and can vary in dimension (thickness). There is usually a third ply and sometimes a fourth.

If required, a heat gun and a roller can be used to ensure that the end patterns in the two interweave layers 104, 204 are at least tacked down onto the underlining thermoplastic.

A hot air gun is used to warm the underside of a first leg of the female end of the interweave layer 104 that is to be welded down or tacked in place. A similar procedure is used for the second leg of the female end to weld or tack it in place, and in both cases, expel air. Similar procedures are followed for the male end of the interweave.

Figure 15:
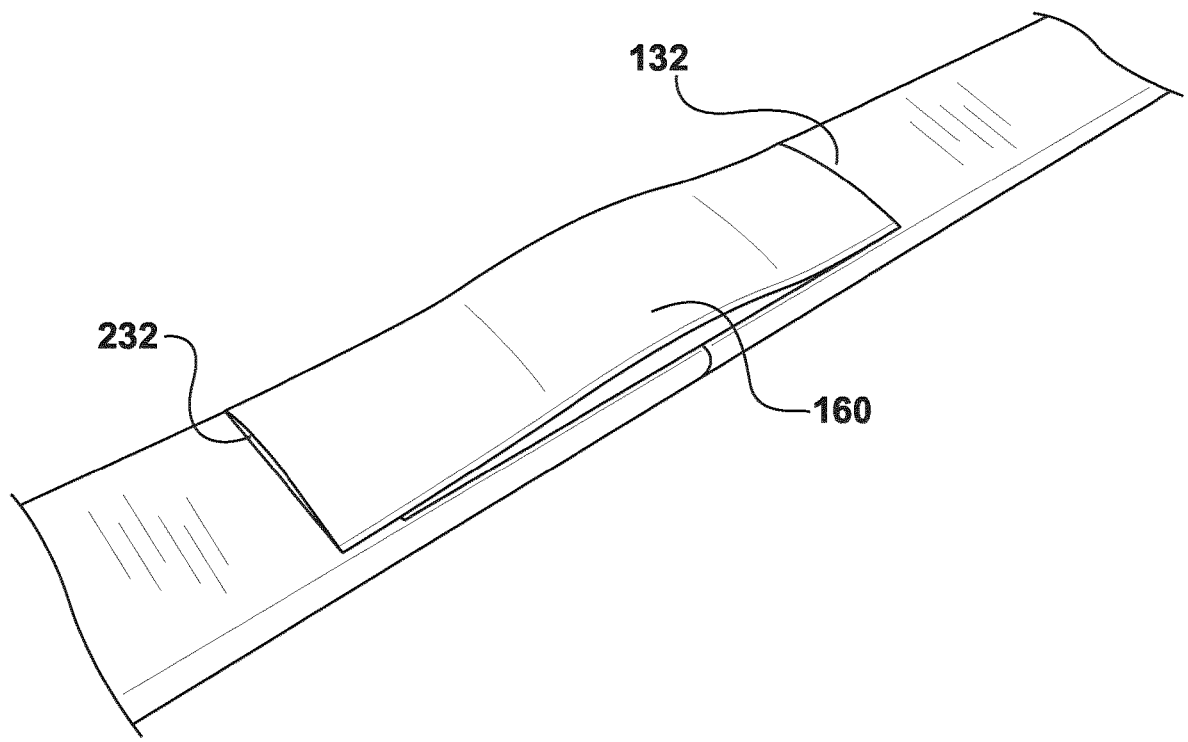
FIG. 15 shows a perspective view of end portions assembled together, and placement of a top cap.

To complete the splice joint, a cap 160 is prepared, as shown in FIG. 15. The cap 160 is prepared by cutting a piece from a length of the handrail corresponding to the removed scalp layers 102, 202. As such, the cap 160 should have the thickness of the scalp 102, 202 plus the thickness of any material removed by the band saw or other cutting tool, minus allowance for any material effectively replaced by insertion of plies, as detailed above.

The splice as assembled leaves space between vertical end edges 132, 232 of the handrail ends 100, 200. The cap 160 is cut to be slightly longer than this distance.

To mount the cap 160, one end of the cap 160 is positioned over the splice area with an end of the cap 160 facing and spaced by few mm from an end of edge surface 132, 232. A hot air gun is used to heat the end surface of the cap 160 and the facing edge surface. When sufficiently heated, the end surface is pressed up against the hot edge surface; the heating may be such as not to cause melting of the material. The cap should be level and with no cracks where air can be trapped.

At the other end of the splice, the cap should be checked to ensure that it is straight and centered in the splice area. Using a metal carbon square guide and utility knife, the cap 160 is then trimmed so that it is slightly longer than the space between the two facing edge surfaces 132, 232, e.g. the cap 160 can extend 1 mm past, by overlapping the other edge surface. The cap may then bulge upwards.

As for the other end, a hot air gun is used to heat the end surfaces of the cap 160 and the other more facing edge surface of the other handrail end. The cap is then pressed tightly against the edge surface. Again, this may be done so as not to overheat the cap and so as not to cause melting material, but to leave the cap level with no trapped air.

Figure 16:
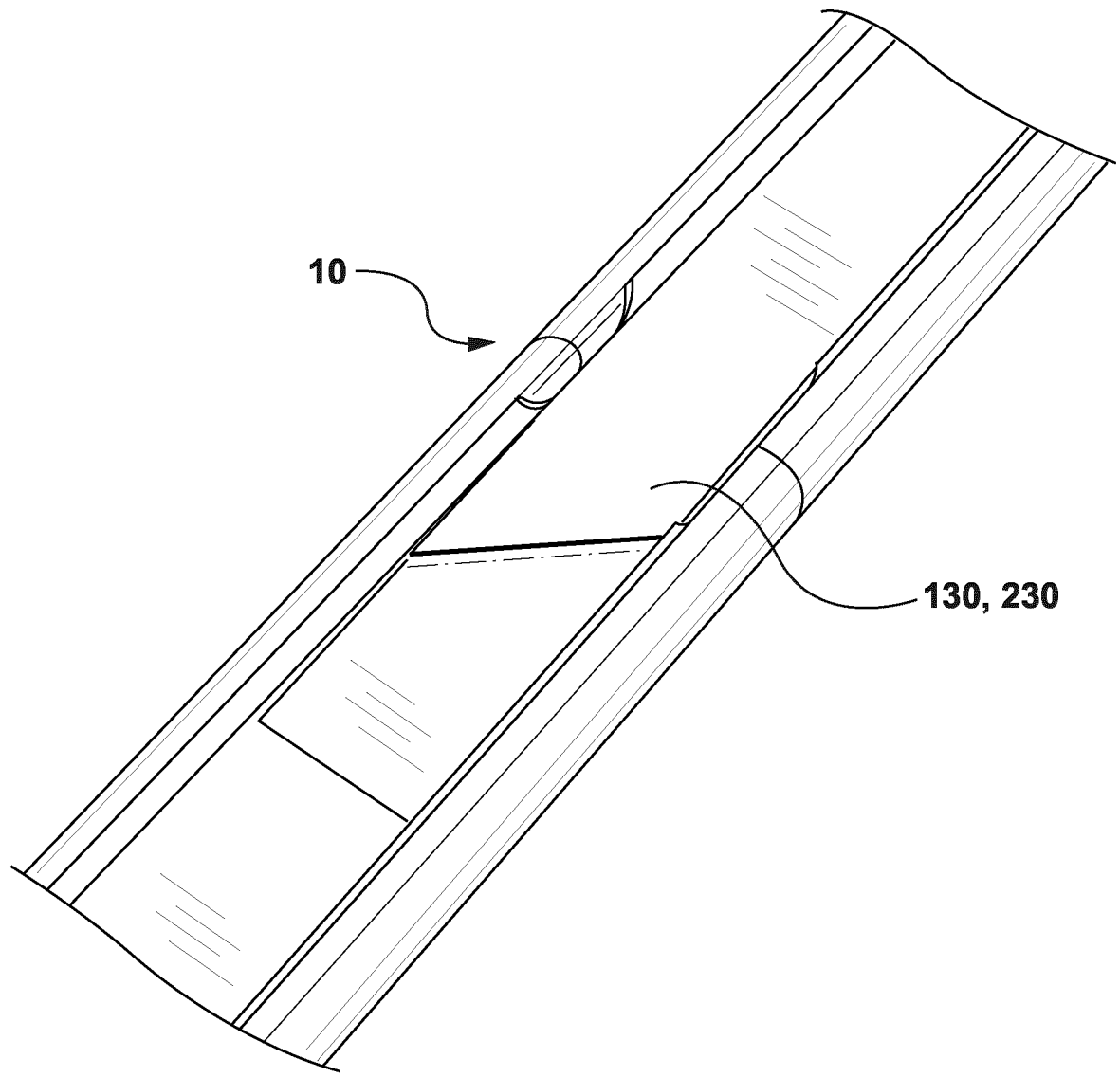
FIG. 16 shows a perspective view from underneath, showing location of the tab.

Finally, the spliced area is cleaned and a protective film is provided to the splice. The protective film is to keep the surface clean and protected until installation. It will be removed prior to installation. It is a clear plastic film that is applied to the entire handrail during extrusion. During splicing the film is removed and a new section is added once the splice is complete The spliced joint is then inverted and the handrail can be clamped in an inverted position with the belly interior of the handrail facing upwards, as shown in FIG. 16.

A piece of adhesive ply is then inserted. The adhesive TPU ply differs in composition to the body plies, and is very thin (0.25 mm). It includes a layer of slider fabric with a thin layer of TPU adhesive, and the same material is used to form saddles, as detailed below. The adhesive TPU ply is cut to be approximately 15-20 mm longer and 1 to 2 mm wider than the tab 130 and is placed under the tab 130.

Using a hot air gun with a lower blowing speed, the adhesive ply is heated underneath the tab 130, and the tab 130 is then pushed into the belly of the handrail to have it adhere to the slider fabric 20. The adhesive extending beyond the tab is then rolled back to the edge of the tab forming a bead that fills the step between tab and belly.

With the tab 130 adhered to the slider fabric 20 of the handrail end portions, any mushroom effect created by the bonding of the first and second handrail ends 100, 200, can be trimmed and removed from the top of the lip to the slider in the belly inside the throat area using a rotary tool. This material is removed to ensure that the splice is not too bulky and will fit into a mould correctly.

The cavity formed in the handrail lip where the slider edges has been removed 124 is filled with strips of handrail cover material and bonded using a hot air gun.

Figure 17A:
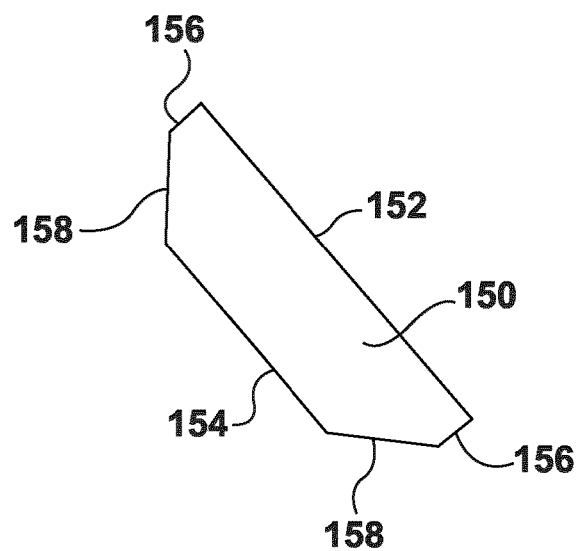
FIG. 17A shows a plan view of a saddle and also a saddle template.
Figure 17B:
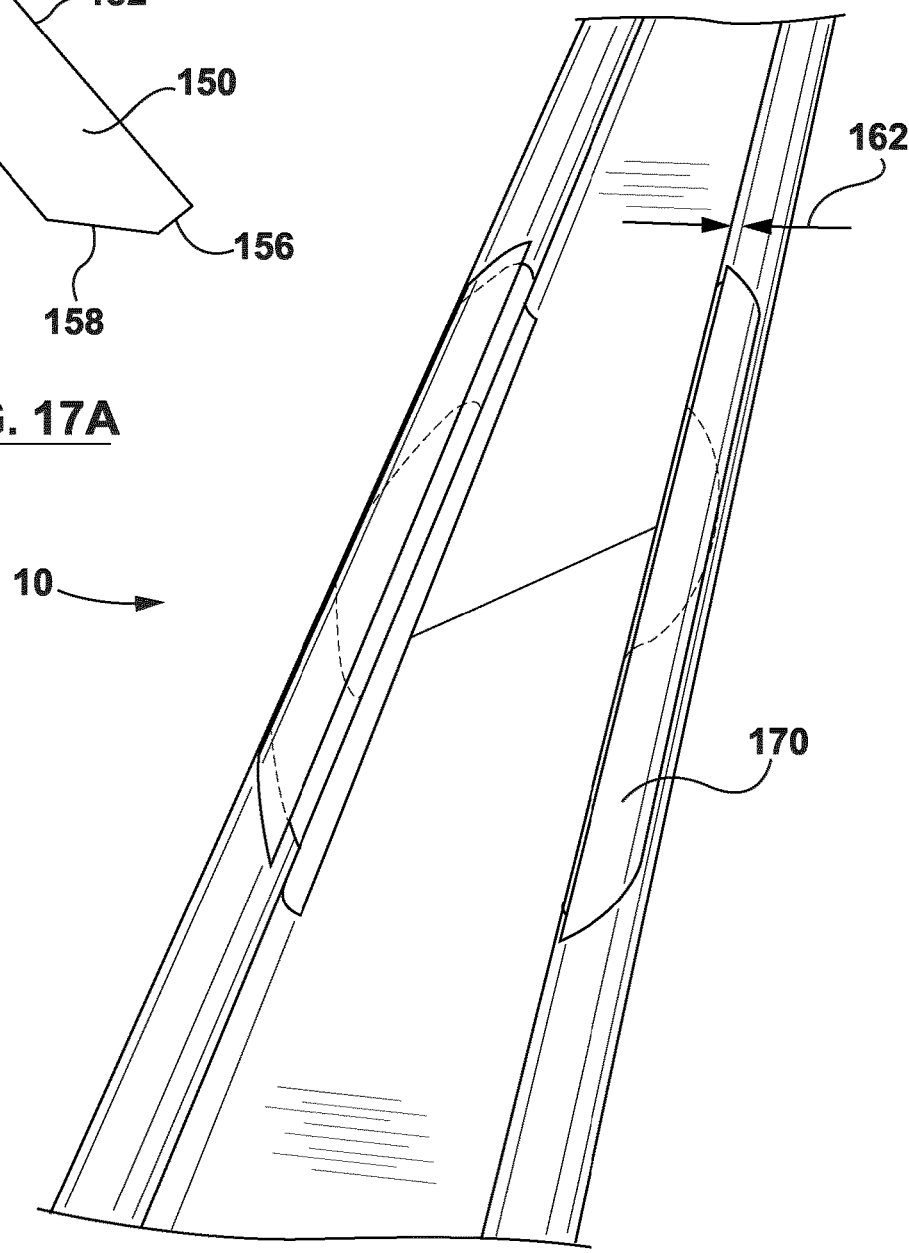
FIG. 17B shows a perspective view from underneath, showing placing saddles on the joint.

Fresh, unused slider fabric, including an adhesive layer, is then obtained and cut to form saddles 150. This saddle material is pre coated with a TPU adhesive, and is the same material as the ply used to secure the tab in position, as mentioned above. FIG. 17A shows the shape of a saddle, and a saddle template is provided for cutting the saddle and having the same shape as the saddle 150 shown in FIG. 17A. The saddle template is aligned on the saddle material at 45°, using a carpenter's square or the like. The bias is 45 degrees from the longitudinal direction, i.e. 45 degrees to the lines 152, 154. The saddle 150 is cut from the fabric material to the shape of the template. As shown in FIG. 17B, a mark 162 is made on the shoulder of handrail 12 mm from the face of the lip, as indicated by arrows, to align an edge of the saddle.

The saddle 150 can be considered a trapezoid, with end triangles cut off. Thus, the saddle 150 has, relative to its position in the handrail, an inner edge 152 and an outer edge 154 parallel to one another, and two end edges 156 perpendicular to those inner and outer edges 152, 154, respectively. Two inclined edges 158 complete the shape of the saddle 150.

The saddle 150 is then placed on the shoulder portions 113, centered on the weld joint, with the saddle outer edge 154 aligned with the 12 mm mark made above. The saddle is held and heat is applied to the shoulder portions 113 and the adhesive of the saddle. The saddle 150 is pressed down onto the shoulders so that it is centered on the weld and is aligned with the 12 mm mark. The material should be heated sufficiently to give a proper bond. A hot air gun may be used to heat the fabric side of the saddle and to continue to fold the saddle over the top lip facing and into the throat area. All edges should be as straight and as parallel as possible. The adhesive should not be overheated as it may not be desirable to have the saddle bond completely with a slider fabric. At this time, the main function of heating is to make the saddle 150 more flexible.

The above steps are repeated for a saddle 150 on the other side of the splice joint.

After the saddle 150 has been tucked into the belly of the handrail, heat is applied to the edges of the saddles 150 that proceeds over the lip face and pressed firmly to ensure that the saddle is properly positioned when the splice is placed in the mould.

With both saddles 150 in place, a piece of handrail that was used to make the cap 160 can then be used to obtain strips 170 of cover material to seal the edges of the saddles 150. For this purpose, this piece of the handrail is turned upside down.

The strips 170 of cover material can be obtained, by taking a piece of the handrail, and marking three or four spots along the length of the handrail shoulder. These may be measured and marked, using a grease pencil or other removable marking device, 5 mm and 18 mm around the shoulder from where the cover material falls on top of the lip. A utility knife may then be used to remove a strip 170 of covering material from the shoulder, using the marks above to determine edges to this strip 170. The strip of materials may be 1.5 mm or less in thickness.

These strips 170 are cut to a length of 200 mm, for example. As shown in FIG. 17B, each of these pieces is centered on a saddle. For some handrails, the length of the cover piece should be about 10 mm beyond the saddle edge.

A hot air gun (and this may be with a maximum temperature not exceeding 350° C.) is used to tack the piece of covering material to either side of one of the saddles 150, making sure that the width of the piece, for example, 14 mm, is centered over the edge of the saddle 150. The hot air gun may be used to heat and stick down the saddle edge of the cover piece first, before heating and sticking down the shoulder edge of the piece. It may be found that it is more difficult to tack down the piece on the saddle sides, and if so, it may be preferable to start with the heating, such that only the cover pieces are melted, and not the material of the saddle 150. Melting of the saddle material may cause the splice to fail prematurely.

One of the functions of the cover piece is to help seal the saddle adhesive and prevent it from falling out.

To mould the finish splice, an appropriate mould with a core element is selected, for example, as disclosed in U.S. Provisional Application No. 62/591,971 filed on Nov. 29, 2017 and the corresponding International Application entitled MOULD ASSEMBLY FOR FORMING A SPLICED JOINT IN A HANDRAIL OR OTHER ELONGATE ARTICLE, the entire contents of each are herein incorporated by reference. The core is inserted into the T-shape slot 12 at the splice. If the core appears to stick, while removing from the splice or if adhesive is being removed from the belly of the handrail, leaving a gap at the end of the slider tap, a moulding release agent can be applied to the core where the slider tab and the saddle are located.

Before inserting the core into the handrail, the shoulders and saddles can be gently heated with a heat gun to make them more pliable, to help the handrail fit tightly around the core.

The core can be inserted by centering over the splice area and using a putty knife to pry the core into the front shoulder, insertion of the core should be done so as not to move any of the saddles during the insertion process.

While the above description provides examples of one or more apparatuses or methods, it will be appreciated that other apparatuses or methods may be within the scope of the accompanying claims.

We claim:

1. A method of forming a spliced joint in a moving handrail, the handrail comprising a thermoplastic body having a generally C-shaped cross section and defining a T-shaped slot, a stretch inhibitor in the thermoplastic body above the T-shaped slot and a slider fabric layer around an interior of the T-shaped slot, wherein the handrail comprises first and second end portions, each comprising a forward part extending from an end surface of the end portion and a rear part adjacent the forward part, the method comprising:

in each of the rear and forward parts of the first and second end portions, providing a first horizontal cut to separate a top section of the thermoplastic body from a base section comprising shoulder portions of the thermoplastic body, the slider fabric layer and a layer of thermoplastic above the slider fabric layer joining the shoulder portions together;

for each end portion, removing at least the shoulder portions from the forward part thereof, to leave a central portion comprising a forward part of the slider fabric layer and the layer of thermoplastic;

cutting the forward parts of the slider fabric layer and the layer of thermoplastic to a required shape; and assembling the first and second end portions together to form a spliced joint for moulding, wherein the spliced joint is provided with a centerline, for each of the first and second end portions, the forward and rear parts are provided on either side of the centerlines of the spliced joint, and the base sections of the rear parts of the first and second end portions abut one another and are joined together, and wherein, for each of the first and second end portions, the first horizontal cut is provided extending through the forward and rear parts, and a second horizontal cut is provided, above the stretch inhibitor, extending through the forward and rear parts, and wherein vertical cuts are provided at ends of the second horizontal cuts to remove a scalp layer from each of the first and second end portions, the first and second horizontal cuts leaving respective first and second interweave layers including the stretch inhibitor.

2. The method of claim 1, wherein the layer of thermoplastic above the forward part of the slider fabric layer is sufficiently thin that a tab portion can be formed from the slider fabric layer, incorporating part of that layer of thermoplastic for overlapping and bonding to another portion of the slider fabric layer while maintaining internal dimensions of the T-shaped slot.

3. The method of claim 1, comprising providing, for each of the first and second end portions, generally vertical and longitudinally extending cuts extending from the centerline to the end surface thereof, through the joining layer of thermoplastic, adjacent and above edges of the T-shaped slot, to enable separation of the shoulder portions from the slider fabric layer.

4. The method of claim 3, wherein edges of the slider fabric layer are embedded in the thermoplastic of the shoulder portions, and wherein the method comprises providing longitudinal cuts to enable separation of the edge portions of the slider fabric layer from the shoulder portions.

5. The method of claim 4, comprising, for each of the first and second end portions, cutting a part of the slider fabric layer extending across a top of the T-shaped slot along the centerline, and cutting the slider fabric layer, where it extends in the shoulder portions, in a plane extending at a 45 degree angle to the cross-section of the handrail at the centerline and inclined from the centerline at the top of the T-shaped slot away from the end thereof.

6. The method of claim 5, comprising cutting the slider fabric layer with a rotary abrasive tool.

7. The method of claim 5, comprising extending the longitudinal cuts to the 45 degree angled cut in the slider fabric layer.

8. The method of claim 1, comprising providing the stretch inhibitor as a plurality of an elongate stretch inhibitor members, and cutting into the interweave layer longitudinally to provide a plurality of elongate pieces each incorporating at least one elongate stretch inhibitor member and cutting the elongate pieces in different lengths, wherein the first interweave layer of the first end portion forms a male pattern and the second interweave layer in the second end portion forms a corresponding female pattern complementary to the male pattern.

9. The method of claim 8, wherein the elongate pieces in each of the first and second end portions are cut to one of five different lengths, with one length corresponding to the centerline of the spliced joints, with two of the lengths being short of the centerline and two of the lengths being longer than the centerline.

10. The method of claim 8, comprising providing at least one thermoplastic ply layer between the interweave layers and the base sections, and at least one thermoplastic ply layer above the interweave layers.

11. The method of claim 1, comprising providing a replacement cap, to replace the scalp layers removed from the first and second end portions.

12. The method of claim 11, wherein the replacement cap is cut to be slightly longer than the spacing between the end surfaces of the first and second end portions.

13. The method of claim 11, comprising heating and softening ends of the replacement cap and edge surfaces of the first and second end portions, to at least tack the replacement cap in position.

14. The method of claim 10, comprising, for at least one of the ply layers, using a heating device to heat the ply layer and underlining thermoplastic, and applying pressure to at least tack the ply layer in position.

15. The method of claim 14, wherein the ply layer is heated with a hot air gun, and pressure is applied using a roller.

16. The method of claim 1, wherein the assembled spliced joint is placed in a mould and comprising heating the assembled spliced joint to a temperature above 170 degrees Celsius for a time period of at least 30 seconds, whereby the various thermoplastic components melt and bond together, to form a completed spliced joint, and cooling the assembled spliced joint before removal from the mould.

17. The method of claim 16, wherein the mould comprises two mould parts enclosing the assembled spliced joint and a core element fitting in the T-shaped slot of the handrail, wherein the core element is mounted floating in the T-shaped slot.

18. The method of claim 17, comprising providing actuators for providing pressure on the core element urging the core element in a direction towards the top of the handrail, wherein during at least heating of the assembled spliced joint, the actuators apply pressure to the core element.

19. The method of claim 18, wherein after cooling of the assembled spliced joint, the mould parts are separated to release the assembled spliced joint and the actuators apply further pressure to urge the core element away from one of the mould elements.

20. A method of forming a spliced joint in a moving handrail, the handrail comprising a thermoplastic body having a generally C-shaped cross section and defining a T-shaped slot, a stretch inhibitor in the thermoplastic body above the T-shaped slot and a slider fabric layer around an interior of the T-shaped slot, wherein the handrail comprises first and second end portions, each comprising a forward part extending from an end surface of the end portion and a rear part adjacent the forward part, the method comprising:
  in each of the rear and forward parts of the first and second end portions, providing a first horizontal cut to separate a top section of the thermoplastic body from a base section comprising shoulder portions of the thermoplastic body, the slider fabric layer and a layer of thermoplastic above the slider fabric layer joining the shoulder portions together;
  for each end portion, removing at least the shoulder portions from the forward part thereof, to leave a central portion comprising a forward part of the slider fabric layer and the layer of thermoplastic;
  cutting the forward parts of the slider fabric layer and the layer of thermoplastic to a required shape; and
  assembling the first and second end portions together to form a spliced joint for moulding,
  wherein the assembled spliced joint is placed in a mould and comprising heating the assembled spliced joint to a temperature above 170 degrees Celsius for a time period of at least 30 seconds, whereby the various thermoplastic components melt and bond together, to form a completed spliced joint, and cooling the assembled spliced joint before removal from the mould,
  wherein the mould comprises two mould parts enclosing the assembled spliced joint and a core element fitting in the T-shaped slot of the handrail, wherein the core element is mounted floating in the T-shaped slot,
  comprising providing actuators for providing pressure on the core element urging the core element in a direction towards the top of the handrail, wherein during at least heating of the assembled spliced joint, the actuators apply pressure to the core element, and
  wherein after cooling of the assembled spliced joint, the mould parts are separated to release the assembled spliced joint and the actuators apply further pressure to urge the core element away from one of the mould elements.

* * * * *